United States Patent [19]
Horike

[11] 4,310,846
[45] Jan. 12, 1982

[54] DEFLECTION COMPENSATED INK EJECTION PRINTING APPARATUS

[75] Inventor: Masanori Horike, Tokyo, Japan

[73] Assignee: Ricoh Company, Ltd., Tokyo, Japan

[21] Appl. No.: 106,806

[22] Filed: Dec. 26, 1979

[30] Foreign Application Priority Data

Dec. 28, 1978 [JP] Japan ............................ 53-164852
Dec. 30, 1978 [JP] Japan ............................ 53-165187

[51] Int. Cl.³ ............................ G01D 18/00
[52] U.S. Cl. ............................ 346/75
[58] Field of Search ............................ 346/75, 140

[56] References Cited

U.S. PATENT DOCUMENTS

| | | | |
|---|---|---|---|
| 3,465,351 | 9/1969 | Keur | 346/75 |
| 3,787,882 | 1/1974 | Fillmore | 346/75 |
| 3,866,237 | 2/1975 | Meier | 346/75 |
| 3,898,673 | 8/1975 | Haskell | 346/75 X |
| 4,136,345 | 1/1979 | Neville | 346/75 |

OTHER PUBLICATIONS

Ruddy, G. A.; Viscosity Control Circuit; IBM TDB, vol. 16, No. 10 Mar. 1974, p. 3295.

*Primary Examiner*—Joseph W. Hartary
*Attorney, Agent, or Firm*—David G. Alexander

[57] ABSTRACT

Prior to printing, ink drops are ejected from an ink ejection head or nozzle (28) and an amount of deflection is sweepingly varied until the ink drops hit a target (57), thereby providing a reference which compensates for variations in an amount of charge of the ink drops, a deflection voltage and an ink drop velocity. The ink temperature or an ejection pump pressure are sweepingly varied, prior to the deflection sweep operation, until a sensed ink ejection velocity and thereby ink drop mass become equal to a predetermined value to provide a desired printing density or darkness.

18 Claims, 17 Drawing Figures

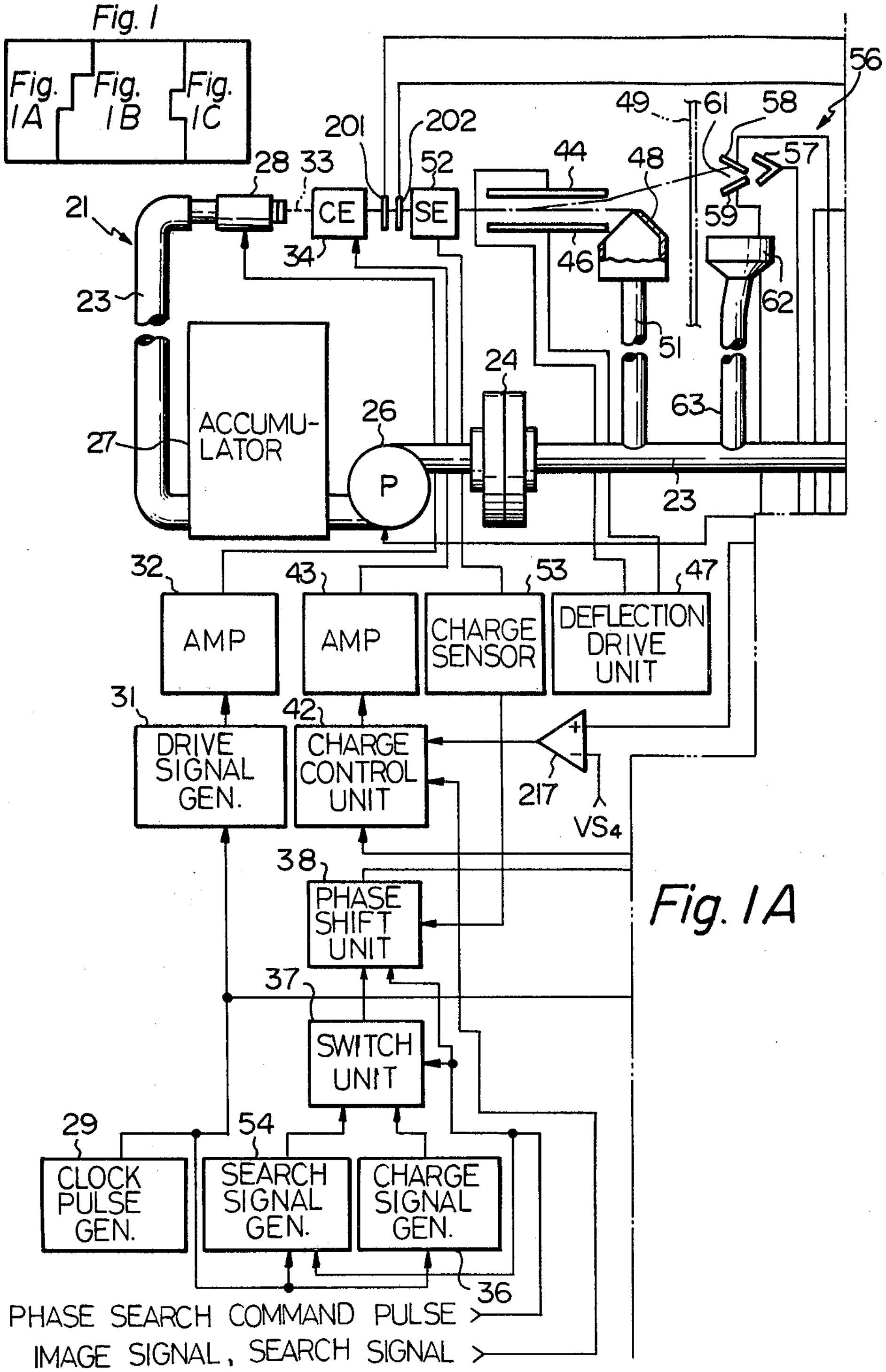
Fig. IA

DEFLECTION COMPENSATED INK EJECTION PRINTING APPARATUS

BACKGROUND OF THE INVENTION

The present invention relates to an ink ejection printing apparatus for an ink jet printer. Such a printer comprises an ink ejection nozzle in which is provided an ultrasonic vibrator. Application of ejection or drive pulses to the vibrator causes an ink jet ejected from the nozzle to be atomized into drops or droplets. The ink drops are electrically charged by an electrode. A deflection voltage is applied to deflection electrodes which deflect the charged droplets onto paper for printing. Where it is desired not to print a dot, no charging voltage is applied and the ink droplets are caught by a gutter. A prior art example of such an ink ejection printing apparatus is disclosed in IBM Technical Disclosure Bulletin Vol. 16, No. 12, May 1974, Japanese patent publication No. 47-43450 and Japanese patent application disclosure No. 50-46450.

One problem in a system of the present type is to synchronize application of the charging pulses applied to the charging electrode with the position of the ink drops. The charge will be optimum only if the charging pulses are applied to the charging electrode at the time the ink drops are adjacent to the electrode. Synchronism can be achieved by providing a sensing electrode downstream of the charging electrode for sensing the amount of charge on the ink drops and varying the phase between ink ejection pulses and charging pulses until a desired charge value is achieved. This is known as a phase sweep operation and is disclosed in Japanese patent publication No. 47-43450 and Japanese patent application disclosure No. 50-60131.

Another problem is in adjusting the amount of deflection of the ink jet to an optimum value. If the deflection is too great or too small, the printed image will be distorted, particularly enlarged or reduced in relation to the main scan feed pitch. This can, in extreme cases, produce an unintelligible image. The problem is compounded by the fact that the deflection is a function of a number of variables, including the charge on the ink drops, the mass of the ink drops, the deflection voltage, the spacing between the deflection electrodes and the ejection velocity of the drops. Mere adjustment of the ink drop charge using the phase sweep operation cannot result in a predetermined amount of deflection since the deflection also depends on the other variables.

Another problem involves the printing density, or the darkness of the printed characters or pattern. If the mass of the ink drops in too high, the printing density will be excessive and vice-versa. The printing density varies in accordance with the output pressure of an ink ejection pump and the temperature of the ink.

As the ink temperature increases, the mass of the ink drops decreases and the ejection velocity increases. As the pump pressure increases, the ejection velocity increases. Therefore, there is a correlation between the ink ejection velocity and the printing density. An increase in ink temperature makes the ink thin and decreases the printing density and an increase in pump pressure increases the amount of ink per unit area and increases the printing density. However, the printing density will have a desired optimum value at a corresponding value of ink ejection velocity.

SUMMARY OF THE INVENTION

An ink ejection apparatus embodying the present invention includes ink ejection means for ejecting and charging ink and deflecting the ink from an ejection axis in a direction in response to a deflection signal, and is characterized by comprising, velocity sensor means for sensing an ejection velocity of the ejected ink, and control means for controlling the ink ejection means to sweepingly vary the ejection velocity of the ink until the sensed ejection velocity is equal to a predetermined value.

Prior to printing, ink drops are ejected from an ink ejection head or nozzle and an amount of deflection is sweepingly varied until the ink drops hit a target, thereby providing a reference which compensates for variations in an amount of charge of the ink drops, a deflection voltage and an ink drop velocity. The ink temperature or an ejection pump pressure are sweepingly varied, prior to the deflection sweep operation, until a sensed ink ejection velocity and thereby ink drop mass become equal to a predetermined value to provide a desired printing density or darkness.

It is an object of the present invention to provide an ink ejection printing apparatus comprising means for automatically adjusting the printing density to an optimum value.

It is another object of the present invention to provide an ink ejection printing apparatus which is capable of printing in a manner which is free of distortion.

It is another object of the present invention to provide an ink ejection printing apparatus which is reliable in operation, provides high quality printing and is economical to manufacture on a commercial production basis.

It is another object of the present invention to provide a generally improved ink ejection printing apparatus.

Other objects, together with the foregoing, are attained in the embodiments described in the following description and illustrated in the accompanying drawing.

BRIEF DESCRIPTION OF THE DRAWING

FIGS. 1A–C is a schematic diagram, partially in block form, of an ink ejection printing apparatus embodying the present invention;

DESCRIPTION OF THE PREFERRED EMBODIMENTS

While the ink ejection printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1B:
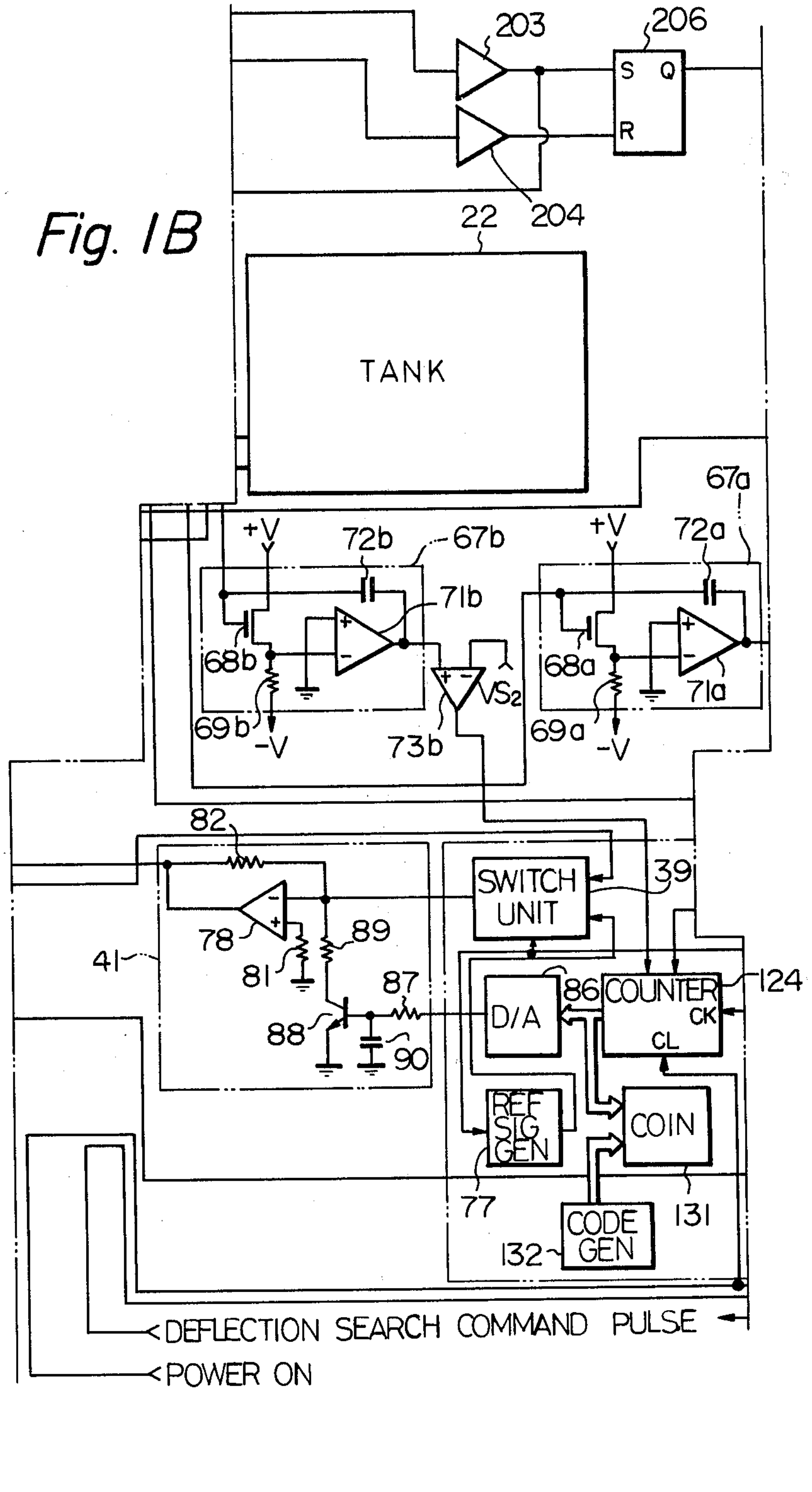
Figure 1C:
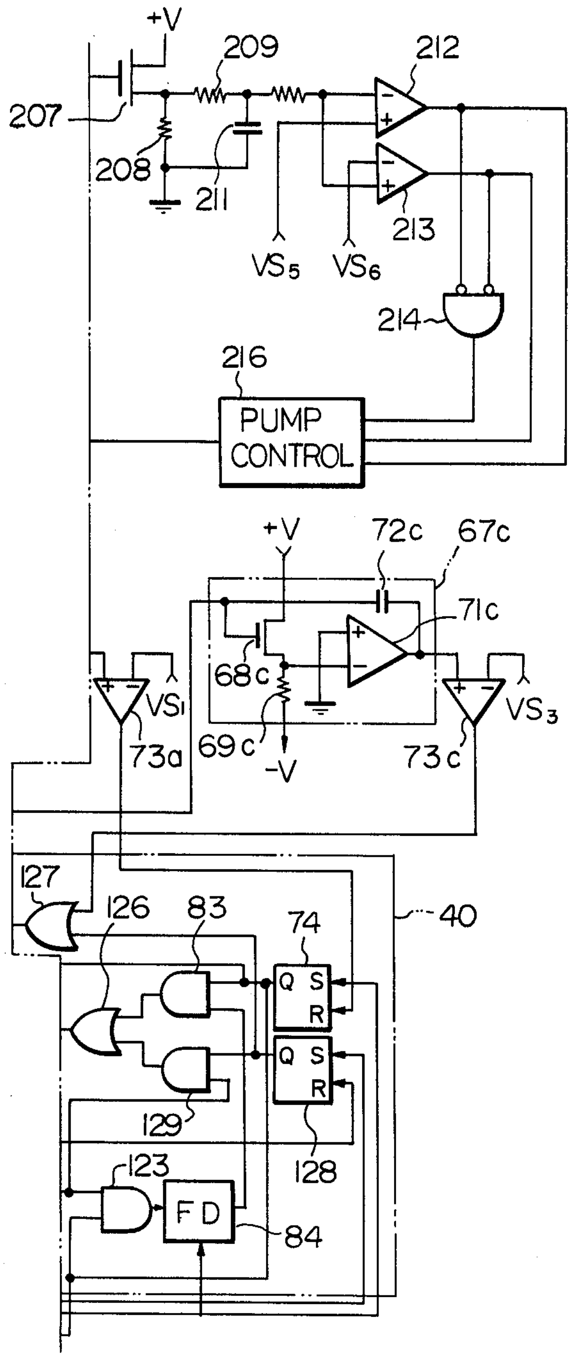

Referring now to FIG. 1 of the drawing, an ink ejection printing apparatus embodying the present invention is generally designated by the reference numeral 21 and comprises a reservoir or tank 22 for containing ink. The tank 22 communicates through a conduit 23 and filter 24 with a pump 26 which pumps the ink to an ink ejection nozzle 28. An accumulator 27 is disposed in the conduit 23 to smooth out pressure fluctuations from the pump 26. A clock pulse generator 29 generates clock pulses which are applied to a drive signal generator 31. The generator 31 produces, in response to the clock pulses, drive or ink ejection pulses which are applied through an amplifier 32 to an ultrasonic vibrator (not shown) in the nozzle 28. The vibrator typically comprises a piezoelectric element which flexes or vibrates in response to applied voltage. The ejection pulses cause the vibrator to vibrate, for example, 612 times per second and create a pressure wave in the nozzle 28 which causes a jet of ink ejected along an ejection axis 33 to be atomized into drops.

The clock pulses are applied to a charge signal generator 36 which generates charge pulses in response thereto. The charge pulses vary in amplitude in a staircase pattern and are applied through a switch unit 37, phase shift unit 38, switch unit 39 of a deflection sweep unit 40, charge level set unit 41, charge control or gate unit 42 and amplifier 43 to the charging electrode 34. The charge pulses are synchronized to be timed in phase relative to the ejection pulses so that the charge pulses will be applied to the charging electrode 34 as the ink drops pass thereby. The electrode 34 induces an electrostatic charge on the ink drops.

The charged ink drops pass between deflection electrodes 44 and 46. A deflection drive unit 47 applies voltages of opposite polarities to the electrodes 44 and 46 such that the voltage applied to the electrode 44 has the opposite polarity of the charge applied to the ink drops and the voltage applied to the electrode 46 has the same polarity as the charge applied to the ink drops. This causes the ink drops to be deflected in the upward direction as viewed in FIG. 1 above a gutter 48 onto a sheet of printing apper 49.

Where it is desired to print a dot on the paper 49, an image signal is applied to the charge control unit 42 which gates the charge pulses to the charging electrode 34. This causes the ink droplets of the jet to be charged and deflected as described upwardly onto the paper 49. Where it is desired not to print a dot, the image signal is not applied to the charge control unit 42 with the result that the ink drops will not be charged. Thus, the deflection electrodes 44 and 46 will have no effect and the ink drops will not be deflected from the axis 33 but will be caught in the gutter 48 and returned through a pipe 51 to the conduit 23. The same effect may be obtained by continuously applying the charging pulses to the electrode 34 and applying the deflection voltages to the electrodes 44 and 46 only when it is desired to print a dot.

Printing is effected by moving the paper 49 perpendicular to the plane of the drawing and applying the image signals to the charge control unit 42. The image signals are generated by a computer or the like and correspond to the characters, pattern or the like which is to be printed. After a scan line is printed in this manner, the paper 49 is moved upwardly by one increment and then moved perpendicular to the plane of the drawing again to print the next scan line.

In order to achieve undistorted printing, the ink drops of the jet must be deflected always by the same predetermined distance which is a function of the amount of incremental movement of the paper 49 in the main scan, or upward direction. Generally, the amount of deflection may be determined by the following equation $$x_d = K \cdot \frac{Q_j \cdot V_{dp}}{m_j \cdot S_{dp} \cdot v_j^2} \quad (1)$$

where $x_d$ is the distance the ink drops are deflected, $Q_j$ is the charge on each ink drop, $V_{dp}$ is the potential across the electrodes 44 and 46, $S_{dp}$ is the spacing between the electrodes 44 and 46 and $v_j$ is the ejection velocity of the ink drops.

The factors K, $m_j$ and $S_{dp}$ may be maintained constant rather easily. However, the deflection still is a function of the three factors $Q_j$, $V_{dp}$ and $V_j^2$. Another variable is how long the ink has been stored in the tank 22.

In order for the apparatus 21 to operate properly, the charging pulses must be applied to the electrode 34 as the ink drops pass thereby. This timing has a major effect on the charge $Q_j$. The phase or timing may be synchronized to an optimum value by means of a phase searching operation which will now be described.

The apparatus 21 further comprises a charge sensor electrode 52 which is disposed between the charging electrode 34 and the deflection electrodes 44 and 46. A charge is induced on the electrode 52 which corresponds to the charge on the ink drops. The electrode 52 is connected to an input of a charge sensor 53 which produces a phase set output when the sensed charge has a predetermined value or exceeds a predetermined value. The phase set signal is applied to the phase shift unit 38.

Prior to an actual printing operation, a phase search command pulse is applied to a search signal generator 54, the switch unit 37 and the phase shift unit 38. A search signal is applied to the charge control unit 42 which has the same effect as the image signal in that it causes the charging pulses to be gated through the charge control unit 42 to the electrode 34. The phase search command pulse causes the switch unit 37 to connect the search signal generator 54 rather than the charge signal generator 36 to the phase shift unit 38.

The search signal generator 54 produces phase search pulses which have the same phase as the charging pulses from the unit 36 but which have a constant amplitude which is equal to the maximum amplitude of the charging pulses. The phase search pulses are applied through the phase shift unit 38, switch unit 39, level control unit 41, charge control unit 42 and amplifier 43 to the electrode 34.

The phase shift unit 38 functions to sweepingly vary the phase of the phase search pulses from in phase with the ejection pulses, through 180° out of phase with the ejection pulses and back to in phase with the ejection pulses. The voltage induced on the electrode 52 will vary from a low value to a maximum value at which point the phase between the phase search pulses and the ejection pulses is such that a maximum amount of charge is induced on the ink drops. The charge sensor 53 produces the phase set signal when the maximum charge is sensed or when the sensed charge has a predetermined value. The phase set signal is applied to the phase shift unit 38 which stops the phase sweep or search operation in response thereto. The phase shift value in the unit 38 is set or locked at the value at the time the phase set signal was received.

After sufficient time has elapsed for the phase search operation to be completed, the phase search command pulse is terminated causing the switch unit 37 to select the output of the charge signal generator 36 for normal operation. The search signal is also terminated allowing the charge control unit 42 to respond to the image signals.

Whereas the phase search operation functions to set the optimum phase relationship between the ejection pulses and the charging pulses, the amount of deflection of the ink drops depends on other factors as discussed above. For this reason, setting the correct phase will not necessarily result in the proper amount of deflection.

Figure 2:
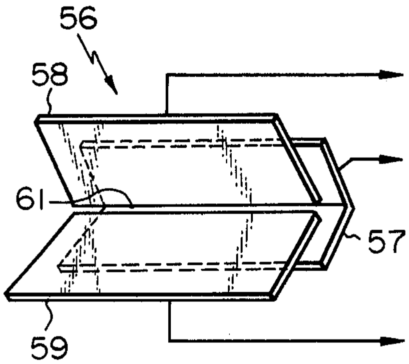
FIG. 2 is a perspective view of a target means of the present apparatus.
Figure 3:
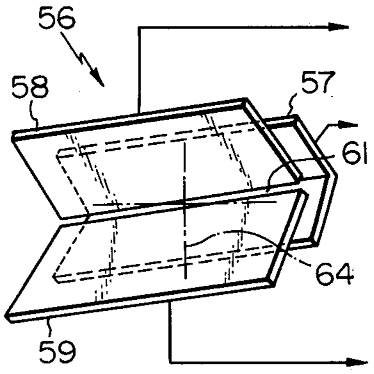
FIG. 3 is similar to FIG. 2 but shows a modified orientation of the target means.

For this reason, the apparatus 21 comprises a target unit 56 which is shown to enlarged scale in FIG. 2. The unit 56 comprises a V-shaped main target electrode 57 which is disposed behind a first auxiliary target electrode 58 and a second auxiliary target electrode 59. The electrodes 58 and 59 are arranged so as to define a slit therebetween which is indicated at 61. Ink ejected from the nozzle 28 and deflected by the electrodes 44 and 46 must pass through the slit 61 to impinge on the electrode 57. A gutter 62 is disposed below the target unit 56 to catch ink which impinges on the electrodes 57, 58 and 59 and runs down into the gutter 62. A pipe 63 conducts ink from the gutter 62 into the conduit 23. If desired, the target unit 56 may be slightly inclined as illustrated in FIG. 3 relative to vertical and horizontal axis indicated at 64 so that the ink will run down the electrodes 57, 58 and 59 leftwardly away from the slit 61.

Figure 4:
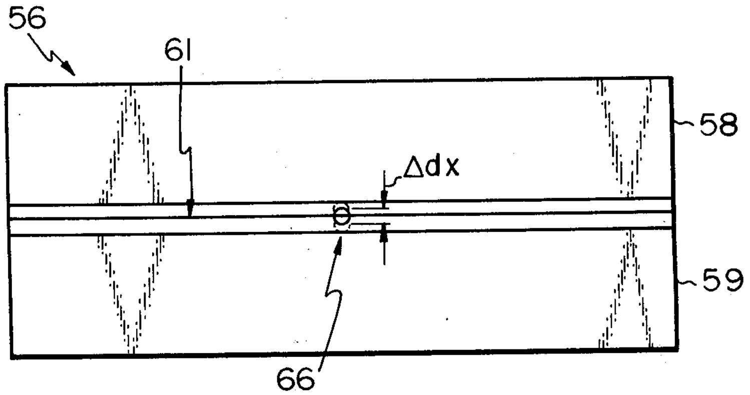
FIG. 4 is a diagram illustrating the operation of the target means.
Figure 5:
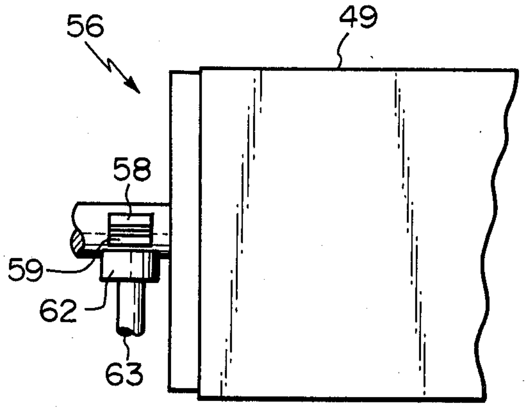
FIGS. 5 and 6 are diagrams illustrating alternative orientations of the target means.
Figure 6:
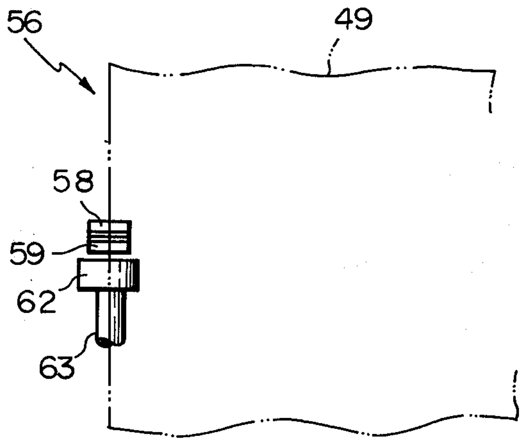

As shown in FIG. 4, the only ink drops which can pass through the slit 61 are those deviate from the center of the slit 61 by a maximum error range $\Delta d_x$ as indicated at 66. The target unit 56 may be disposed at a standby position to the left of the paper 49 as illustrated in FIG. 5 or at a print start position as illustrated in FIG. 6.

The electrode 57 is connected to an electrometer or main hit sensor 67*a* which comprises field effect transistor 68*a*. The source and drain of the transistor 68*a* are connected between sources +V and −V in series with a resistor 69*a*. The electrode 57 is connected to the gate of the transistor 68*a*. The junction of the transistor 68*a* and resistor 69*a* is connected to the inverting input of an operational amplifier 71*a*, the non-inverting input of which is grounded. The output of the operational amplifier 71*a* is connected through an integrating capacitor 72*a* to the gate of the transistor 68*a*. When ink impinges on or hits the electrode 57, a potential is induced thereon which is applied to the electrometer 67*a*. The output of the amplifier 71*a* is connected to the non-inverting input of a comparator 73*a*, the inverting input of which is connected to a reference voltage source VS1. When ink hits the target electrode 57, the induced potential is integrated by the electrometer 67*a* and applied to the comparator 73*a*. When the integrated value exceeds the reference voltage VS1, the comparator 73*a* produces a high output which resets a flip-flop 74. This constitutes a hit signal which means that ink has passed through the slit 61 and hit the electrode 57.

If all conditions are perfect, the ink drops will always hit the target electrode 57. However, this is not usually the case. The present invention provides optimum deflection by performing a deflection search or sweep operation which will be described below.

The auxiliary electrodes 58 and 59 are connected to electrometers 67*b* and 67*c* which are identical to the electrometer 67*a*. Like elements are designated by the same reference numerals suffixed by the characters b and c and will not be described repetitiously.

After the phase search operation is completed, a deflection search command pulse is applied to the set input of the flip-flop 74 and also to a clear or reset input of a binary up-down counter 124. The high Q output of the flip-flop 74 is applied to a reference signal generator 77 and to the switch unit 39. The high Q output of the flip-flop 74 enables the generator 77 to produce a reference signal and causes the switch unit 39 to pass the reference signal, rather than the output of the phase shift unit 38, to the level set unit 41. Preferably, the electrode 57 is spaced from the axis 33 by a large amount which is greater than the deflection desired for regular printing. The reason for this is to maximize the accuracy of the deflection search. However, it is well within the scope of the present invention to space the target electrode 57 from the axis 33 by a distance desired for regular deflection or some other distance.

The reference signal generated by the unit 77 is selected to be larger in magnitude than the charging pulses generated by the unit 36. The reason for this is to enable the ink jet to be deflected by the large distance to the target 57 which is greater than the deflection for normal printing. The reference signal is applied through the switch unit 39 to the level set unit 41 which comprises an operational amplifier 78. The output of the switch unit 39 is connected to the inverting input of the amplifier 78.

The non-inverting input of the amplifier 78 is grounded through a resistor 81. A feedback resistor 82 is connected between the output and inverting input of the amplifier 78. The output of the amplifier 78 is also connected to the charge control unit 42.

The Q output of the flip-flop 74 is connected to an input of an AND gate 83, the output of which is connected to the clock or count input of the counter 124. The clock pulses from the generator 29 are applied through a frequency divider 84 to another input of the AND gate 83. Whereas the ejection pulses from the generator 31 cause the vibrator in the nozzle 28 to vibrate 612 times per second, the frequency divider 84 will have a frequency division ratio of 612 and will produce an output pulse each time 612 drops of ink are ejected.

The output of the counter 124 is connected through a digital-to-analog converter 86 and resistor 87 to the base of an NPN transistor 88. A capacitor 90 is connected between the base of the transistor 88 and ground. The emitter of the transistor 88 is grounded and the collector of the transistor 88 is connected through a resistor 89 to the inverting input of the amplifier 78.

The outputs of the clock pulse generator 29 and flip-flop 74 are connected to inputs of an AND gate 123, the output of which is connected to the input of the frequency divider 84. This enables the frequency divider 84 to receive clock pulses from the generator 29 only during the deflection search operation. The frequency divider 84 is also illustrated as being connected to be reset by the deflection search command pulse. The output of the AND gate 83 is connected to the clock input of the up-down counter 124 through an OR gate 126. A power On signal is applied to the clear input of the counter 124. The output of the comparator **73*b* is connected to a down count control input of the counter 124. The output of the comparator 73*c* is connected through an OR gate 127 to an up count control input of the counter 24. The Q output of a flip-flop 128 is connected to an input of an AND gate 129, the output of which is connected to an input of the OR gate 126. Another input of the AND gate 129 is connected to the output of the clock pulse generator 29. The set input of the flip-flop 128 is connected to receive the power ON signal. The output of the counter 124 is connected to the converter 86 and also to an input of a coincidence unit 131. Another input of the unit 131 is connected to an output of a code generator unit 132. The output of the unit 131 is connected to the reset input of the flip-flop 128**.

The code generator unit 132 comprises a plurality of switches and a diode-resistor matrix, although not shown in detail. Depending on the positions of the switches, the unit 132 produces a particular binary output which constitutes an initial count for the counter 124. The coincidence unit 131 comprises a plurality of exclusive NOR gates in a number equal to the number of bits of the counter 124 and generator unit 132. The outputs of the exclusive NOR gates are connected to inputs of an AND gate. The inputs of the exclusive NOR gates are connected to the respective bit outputs of the code generator unit 132 and counter 124. Thus, the AND gate and thereby the unit 131 will produce a logically high output to reset the flip-flop 128 when the count in the counter 124 is equal to the output of the code generator unit 132.

The switches in the generator unit 132 are set so that the unit 132 produces an output corresponding to a count value in the counter 124 at which the ink jet should pass through the slit 61 and hit the target electrode 57. However, there is usually some deviation and the ink jet will hit the electrode 58 or 59.

The power ON signal sets the flip-flop 128 and clears the counter 124 to a count of zero. The high Q output of the flip-flop 128 enables the AND gate 129 so that the clock pulses from the generator 29 are gated to the clock input of the counter 124. The high Q output of the flip-flop 128 is also applied to the up count input of the counter 124 through the OR gate 127, causing the counter 124 to operate in the up count mode. The high frequency clock pulses from the AND gate 129 and OR gate 126 cause the counter 124 to count up fast. When the count in the counter 124 equals the code output of the generator 132, the coincidence unit 131 produces a high output which resets the flip-flop 128. The Q output of the flip-flop 128 goes low and inhibits the AND gate 129 so that no more clock pulses may be gated to the counter 124. Thus, the counter 124 stops counting at the count value equal to the code output of the generator 132.

The phase search operation is performed in response to the phase search command pulse. After the phase search operation is completed, the deflection command pulse is applied to the unit 40 which sets the flip-flop 74 to begin the deflection sweep or search operation. The frequency divided clock pulses from the frequency divider 84 are applied to the counter 124 through the AND gate 83 and OR gate 126.

If the ink jet hits the target electrode 57, the flip-flop 74 will be reset and the deflection sweep operation terminated. If the ink jet hits the target 58, indicating that the deflection is too great, the comparator **73*b* will produce an output which will cause the counter 124 to be switched to the down count operation. Thus, the clock pulses from the divider 84 will cause the counter 124 to count down and the output of the converter 86 to decrease in magnitude. This will decrease the magnitude of the charge applied to the ink jet and will decrease the deflection thereof. When the ink jet deflection is reduced to the extent that the ink jet hits the main target electrode 57, the comparator 73*a* will produce the main hit signal which will reset the flip-flop 74 and terminate the deflection search. Conversely, if the deflection is too small and the ink jet hits the target electrode 59, the comparator 73*c* will produce an output causing the counter 124 to operate in the up count mode. This will cause the ink jet deflection to progressively increase until the jet hits the electrode 57**.

When the count in the counter 124 is very low, the converter 86 produces a low output. This turns off the transistor 88 which provides a high impedance between the inverting input of the amplifier 78 and ground. The input voltage applied to the amplifier 78 is therefore substantially equal to the reference voltage from the generator 77 and has a maximum value. Since the amplifier 78 is connected in an inverting configuration, the output will be a minimum value. This low voltage applied through the charge control unit 42 to the charging electrode 34 will cause a minimum charge to be applied to the ink drops. Thus, the first ink drops will fall short of the electrode 57 and hit the electrode 59.

The pulses from the frequency divider 84 gated through the AND gate 83 due to the high Q output of the flip-flop 74 progressively increment the counter 124 in the up-count mode. The converter 86 produces a progressively higher output which turns on the transistor 88 to a greater degree and reduces the impedance between the inverting input of the amplifier 78 and ground. The result is that a progressively lower voltage will be applied to the inverting input of the amplifier 78 which will produce a progressively higher output. This will cause a greater charge to be applied to the ink drops so that they will be deflected to a greater extent. When the ink drops are charged enough so as to be deflected through the slit 61 against the electrode 57, the comparator **93*a* will produce the high hit signal output which will reset the flip-flop 74. The AND gate 83 will be inhibited so that no more pulses can be gated therethrough to the counter 124. Thus, the count in the counter 124 will remain at the value at which the ink drops hit the target electrode 57. The low Q output of the flip-flop 74 will de-energize the generator 77 and cause the switch unit 39 to gate the output of the phase shift unit 38 to the level set unit 41 for normal printing operation. The converter 86 will produce an output voltage corresponding to the count in the counter 124 so that the output voltage of the level set unit 41** will be automatically adjusted to a predetermined value for undistorted printing.

The output of the converter 86 determines the gain of the level set unit 41. The magnitude of the charging pulses produced by the generator 36 is proportional to the magnitude of the reference signal produced by the generator 77. More specifically, the magnitude of the charging pulses is lower than the magnitude of the reference signal. Thus, the effect of the level set unit 41 on the charging pulses is the same as on the reference signal from the generator 77. Thus, the charging pulses will cause deflection of the ink jet to an extent proportional to the deflection caused by the reference signal.

This causes the ink jet to be deflected to a predetermined optimum extent which corresponds to the ratio of the magnitude of the reference signal to the magnitude of the charging pulses.

Figures 7, 7A:
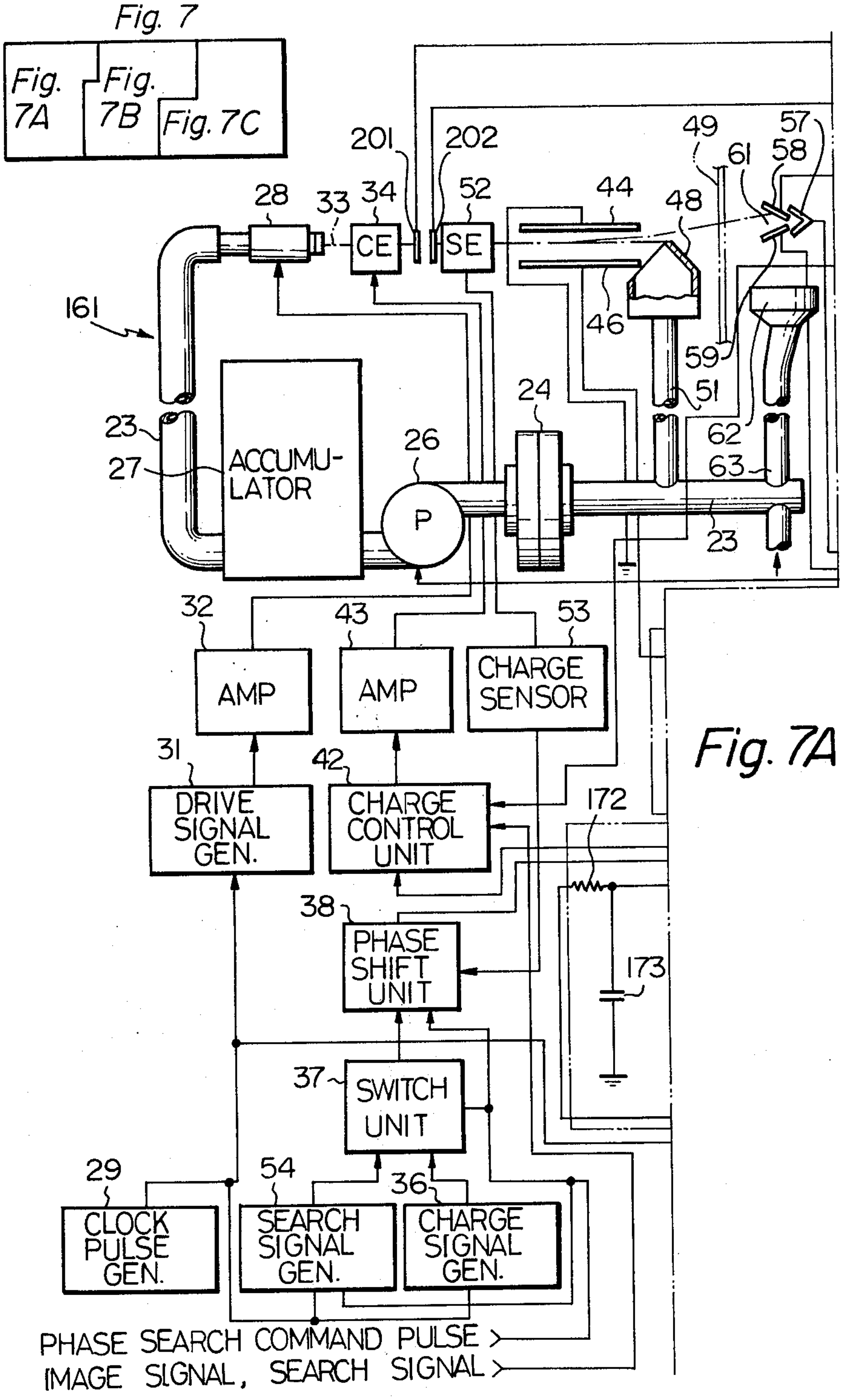
FIGS. 7A–C to 9A–C are similar to FIG. 1 but show alternative embodiments of the present ink ejection printing apparatus.
Figure 7B:
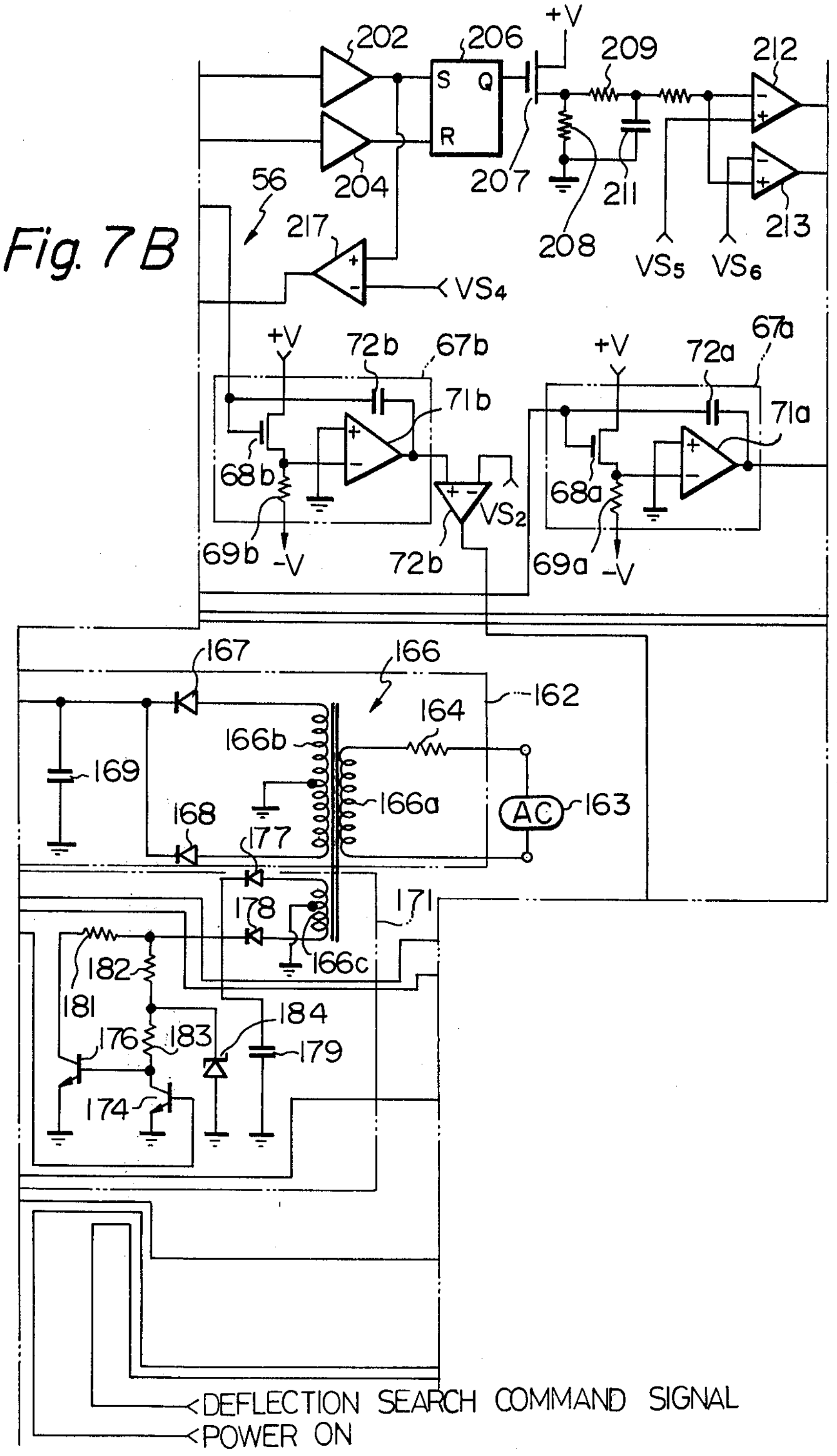
Figure 7C:
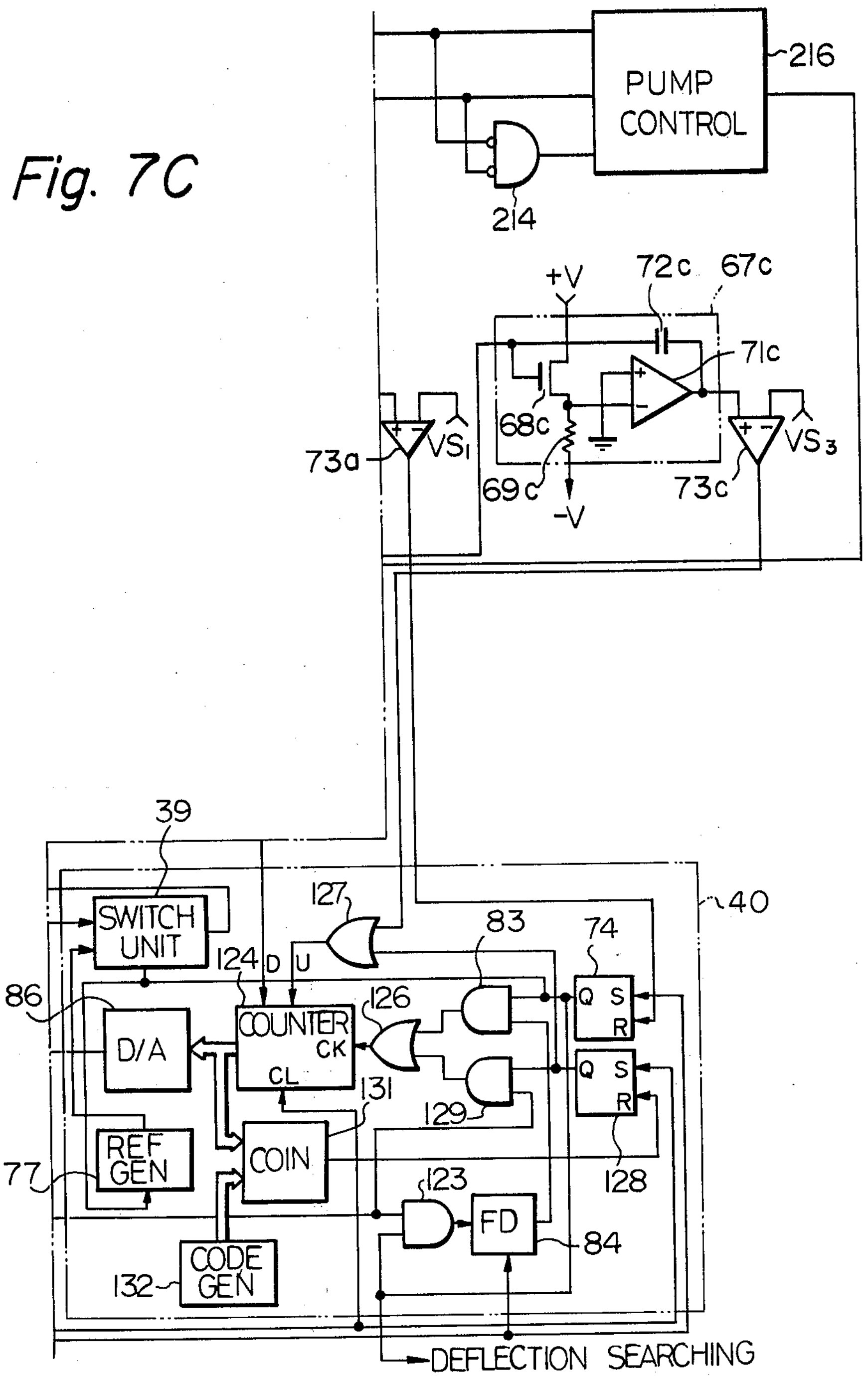

FIG. 7 illustrates an apparatus 161 which is similar to the apparatus 21 except that the deflection is adjusted by means of varying the voltage applied to the electrodes 44 and 46 rather than the electrode 34. The apparatus 161 comprises a power supply 162 comprising an A.C. power source 163 which is connected in series with a resistor 164 across a primary winding 166a of a power transformer 166. A center tap of a secondary winding 166b of the transformer 166 is grounded and the ends of the winding 166b are connected to anodes of diodes 167 and 168 which constitute a full wave rectifier. The cathodes of the diodes 167 and 168 are connected to ground through a capacitor 169 which constitutes a ripple filter and to the electrode 46. The electrode 44 is grounded.

The output of the converter 86 is connected through a resistor 172 and capacitor 173 of a level set unit 171 to ground. The junction of the resistor 172 and capacitor 173 is also connected to the base of an NPN transistor 174, the emitter of which is grounded. The collector of the transistor 174 is connected to the base of an NPN transistor 176, the emitter of which is grounded.

The transformer 166 has another secondary winding 166c, a center tap of which is grounded. The ends of the widing 166c are connected to the anodes of diodes 177 and 178, the cathodes of which are connected to ground through a capacitor 179. The cathodes of the diodes 177 and 178 are connected to the collector of the transistor 176 through a resistor 181 and to the collector of the transistor 174 through resistors 182 and 183. The junction of the resistors 182 and 183 is connected to the cathode of a zener diode 184, the anode of which is grounded.

As the output of the converter 86 increases, the base voltage of the transistor 174 increases. Although the voltage at the junction of the resistors 182 and 183 is maintained constant by the zener diode 184, the collector current of the transistor 174 increases as the base voltage increases and the collector voltage of the transistor 174 decreases. This reduces the current flow through the transistor 176 and resistor 181 and thereby the current flow through the secondary winding 166c and diodes 177 and 178. Thus, a smaller amount of current is consumed by the secondary winding 166c, and the voltage across the capacitor 169 and thereby the voltage applied to the electrode 46 increases. This increases the deflection of the ink jet. In summary, the ink jet deflection increases as the output of the converter 86 increases.

Conversely, as the output of the converter 86 decreases, the current flow through the transistor 174 decreases and the current flow through the transistor 176 increases. This increases the current flow through the secondary winding 166c. Due to the current limiting effect of the resistor 164, increased current flow through the winding 166c will bleed the winding 166b so that the voltage across the winding 166b and thereby across the capacitor 169 decreases. This has the effect of decreasing the voltage applied to the electrode 46 and the deflection of the ink jet. In summary, the ink jet deflection decreases as the output of the converter 86 decreases.

In accordance with the present invention, first and second sensor electrodes 201 and 202 are disposed so that charges corresponding to each ink drop are induced thereon. The electrodes 201 and 202 are connected to inputs of amplifiers 203 and 204, the outputs of which are connected to set and reset inputs respectively of a flip-flop 206. The Q output of the flip-flop 206 is connected to the gate of a field effect transistor (FET) 207 which is turned on when the Q output of the flip-flop 206 is high. The source of the FET 207 is connected to a positive source +V whereas the drain of the FET 207 is grounded through a resistor 208.

The drain of the FET 207 is also connected through a resistor 209 and integrating capacitor 211 to ground, the junction of the resistor 209 and capacitor 211 being connected to an inverting input of a comparator 212 and a non-inverting input of a comparator 213. Reference voltages VS5 and VS6 are applied to the non-inverting input of the comparator 212 and the inverting input of the comparator 213 respectively, with $V5<V6$.

The outputs of the comparators 212 and 213 are connected to inverting inputs of an AND gate 214 and also to control inputs of a pump control unit 216. The control unit 216 is connected to control the output pressure of the pump 26 through variation of the applied voltage, current, duty cycle, stroke or the like by any known means.

The sensors 201 and 202 are spaced apart by a predetermined distance along the path of ejection of the ink from the nozzle 28. Thus, the time required by an ink drop to move from the sensor 201 to the sensor 202 is equal to the distance between the sensors 201 and 202 divided by the velocity of the ink drop. Thus, the time at which the ink drop is sensed by the sensor 202 after being sensed by the sensor 201 is inversely proportional to the velocity of the ink drop.

The flip-flop 206 is set when an ink drop is sensed by the sensor 201 and reset when the same ink drop is sensed by the sensor 202. Thus, the time the Q output of the flip-flop 206 is high corresponds to the velocity of the ink drop on an inversely proportional basis.

A high Q output of the flip-flop 206 turns on the FET 207 and allows the capacitor 211 to charge through the resistor 209. The voltage across the capacitor 211 thereby increases as the velocity of the ink drop decreases since the capacitor 211 will be able to charge for a longer time. Although many ink drops will be sensed by the sensors 201 and 202 in sequence, the voltage across the capacitor 211 will correspond to the average value of the velocity of the ink drops and thereby give an accurate indication.

When the ink ejection velocity is too high, the voltage across the capacitor 211 will be lower than VS5 and the comparator 212 will produce a high output. This output is fed to the pump control unit 216 to cause the output pressure of the pump 26 to increase in a sweeping or slewing manner. If the ink ejection velocity is too low, the voltage across the capacitor 211 will be higher than VS6 and the comparator 213 will produce a high output, causing the control unit 216 to sweepingly decrease the output pressure of the pump 26. It will be recalled that the ink ejection velocity increases as the pump output pressure increases.

When the sensed velocity is within a predetermined range so that the voltage across the capacitor 211 is between VS5 and VS6, neither comparator 212 N or 213 will produce a high output. In addition, the AND gate 214 will produce a high output causing the pump control unit 216 to latch the pump output pressure at the present value at which the output of the AND gate 214 went high. Thus, the velocity of ink ejection and thereby the printing density are automatically controlled to a predetermined optimum value.

Preferably, in response to the power on signal the control unit 216 will set the pump output pressure to a predetermined reference value. After completion of the phase search, the ejection velocity adjustment operation described above is performed. The deflection search operation is initiated in response to the high output of the AND gate 214. Further illustrated is another comparator 217 having its non-inverting input connected to the output of the amplifier 202 and its inverting input connected to receive a reference voltage VS4. The comparator 217 feeds a high output to the charge control unit 42 when the sensed charge is above a predetermined control value.

It is possible to replace the electrodes 201 and 202 with photosensors. In such a case, the velocity control operation may be performed continuously.

Figure 8A:
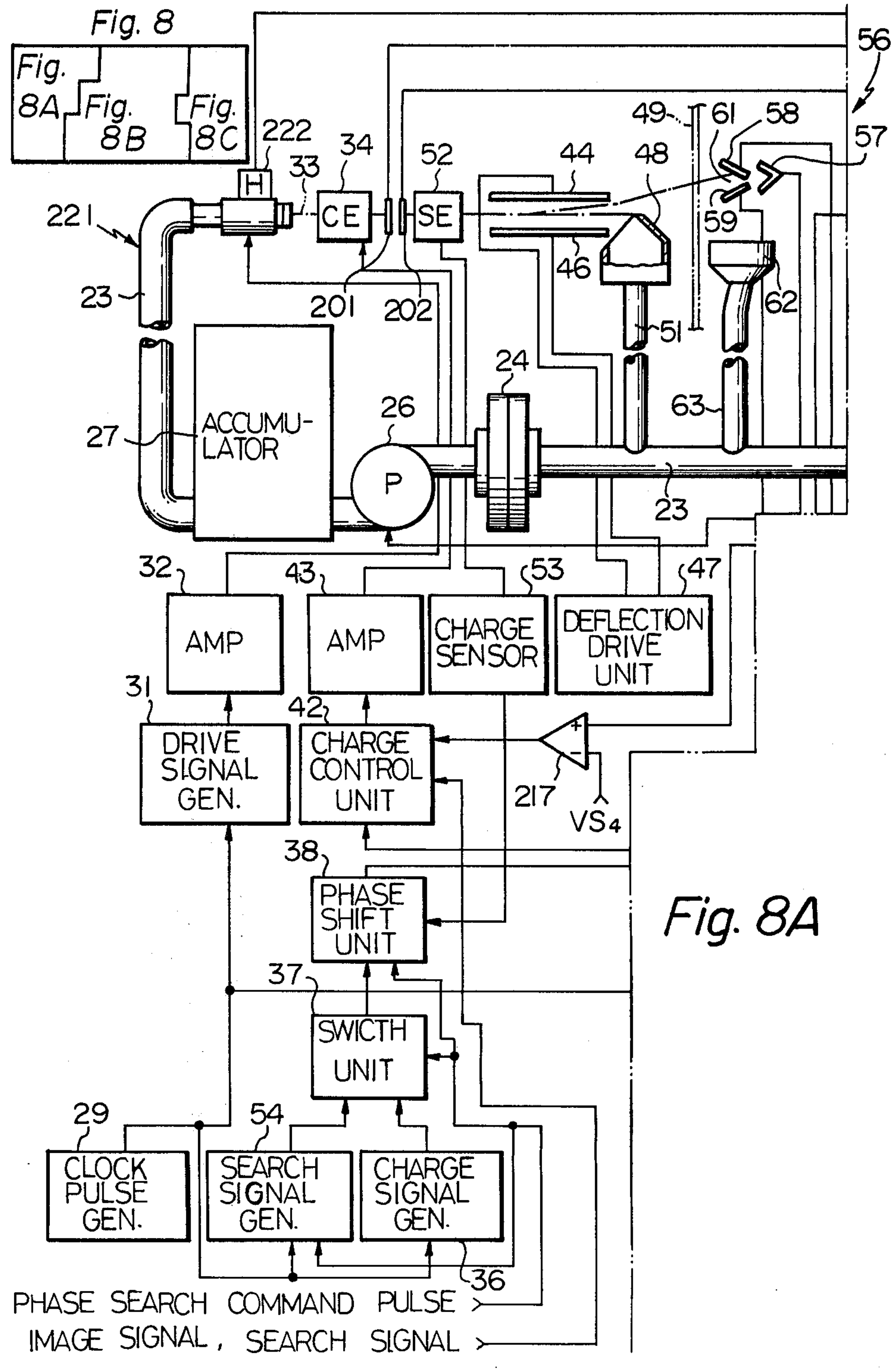
Figure 8B:
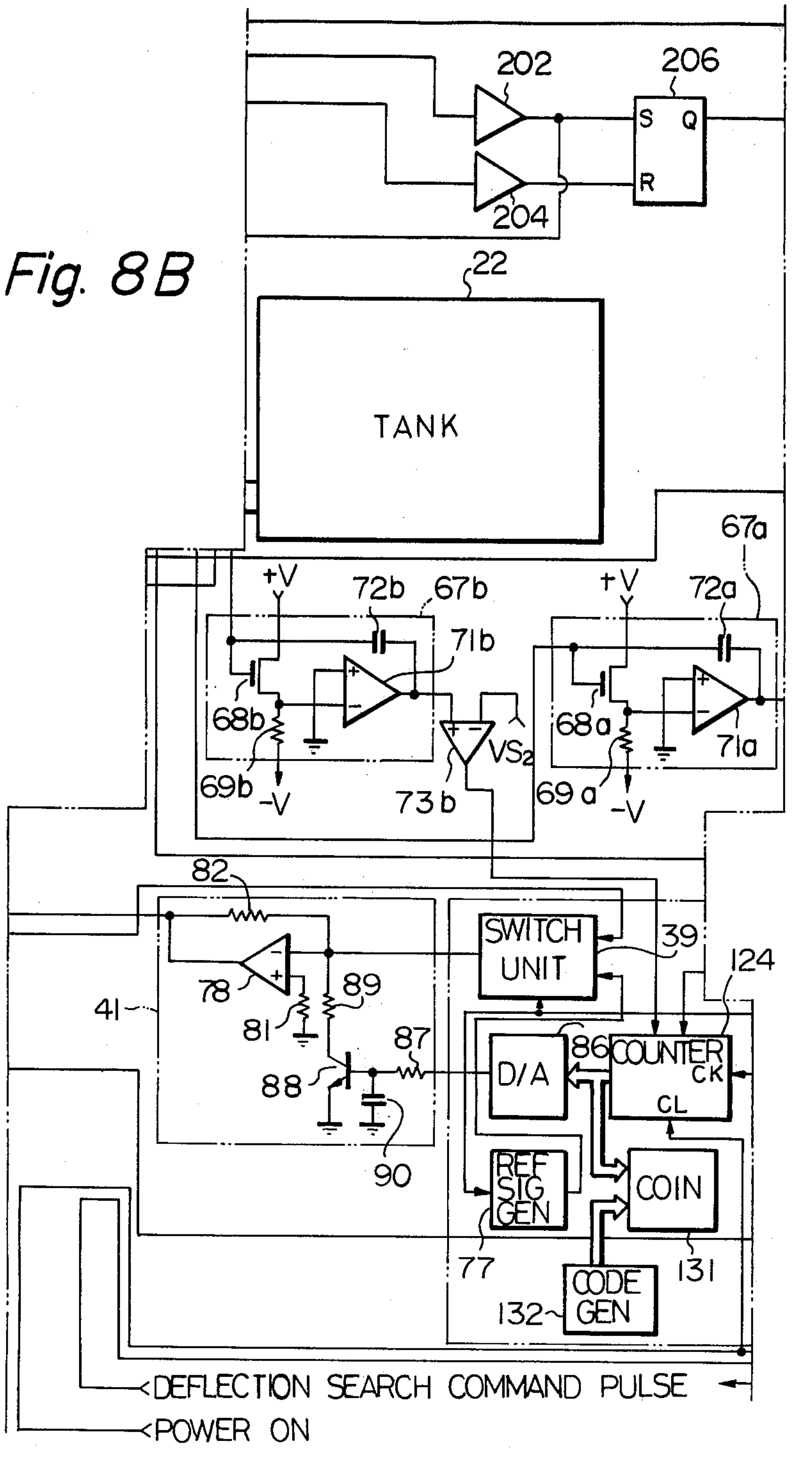
Figure 8C:
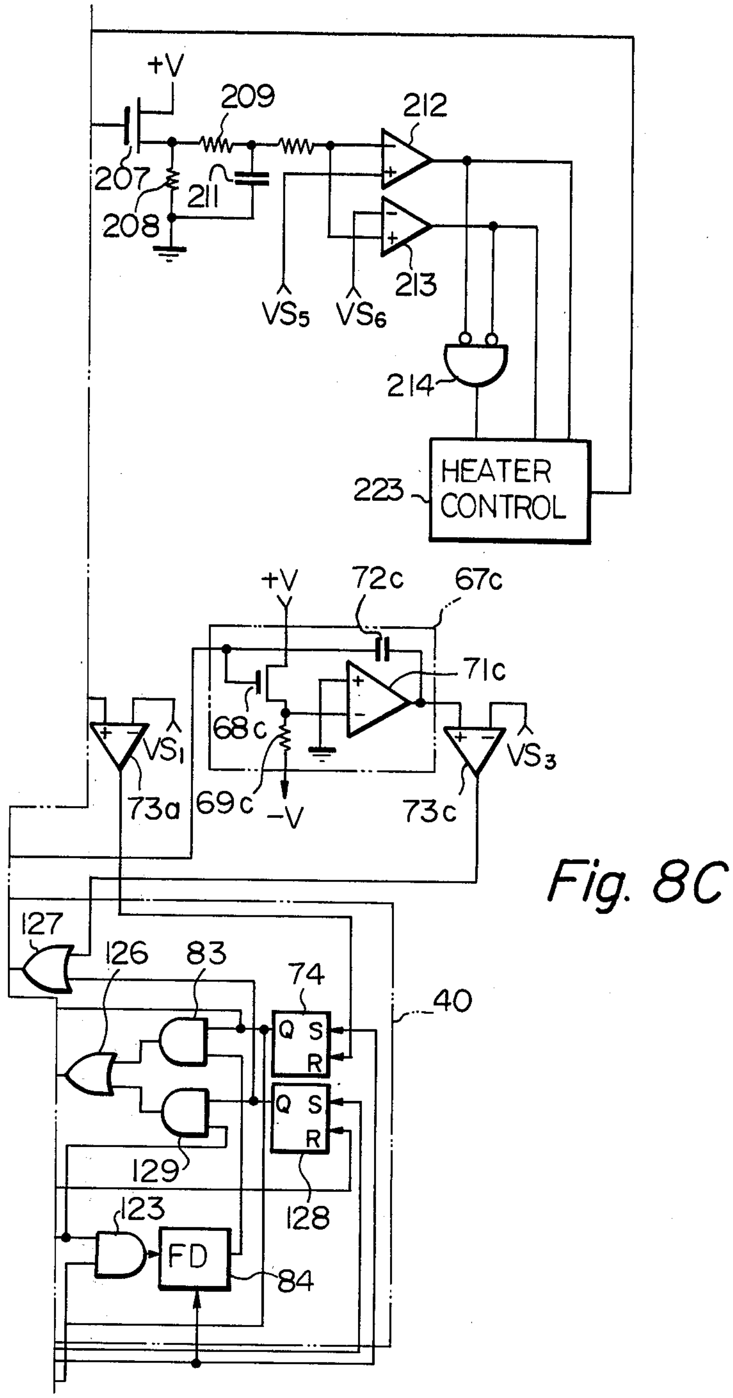
Figure 9A:
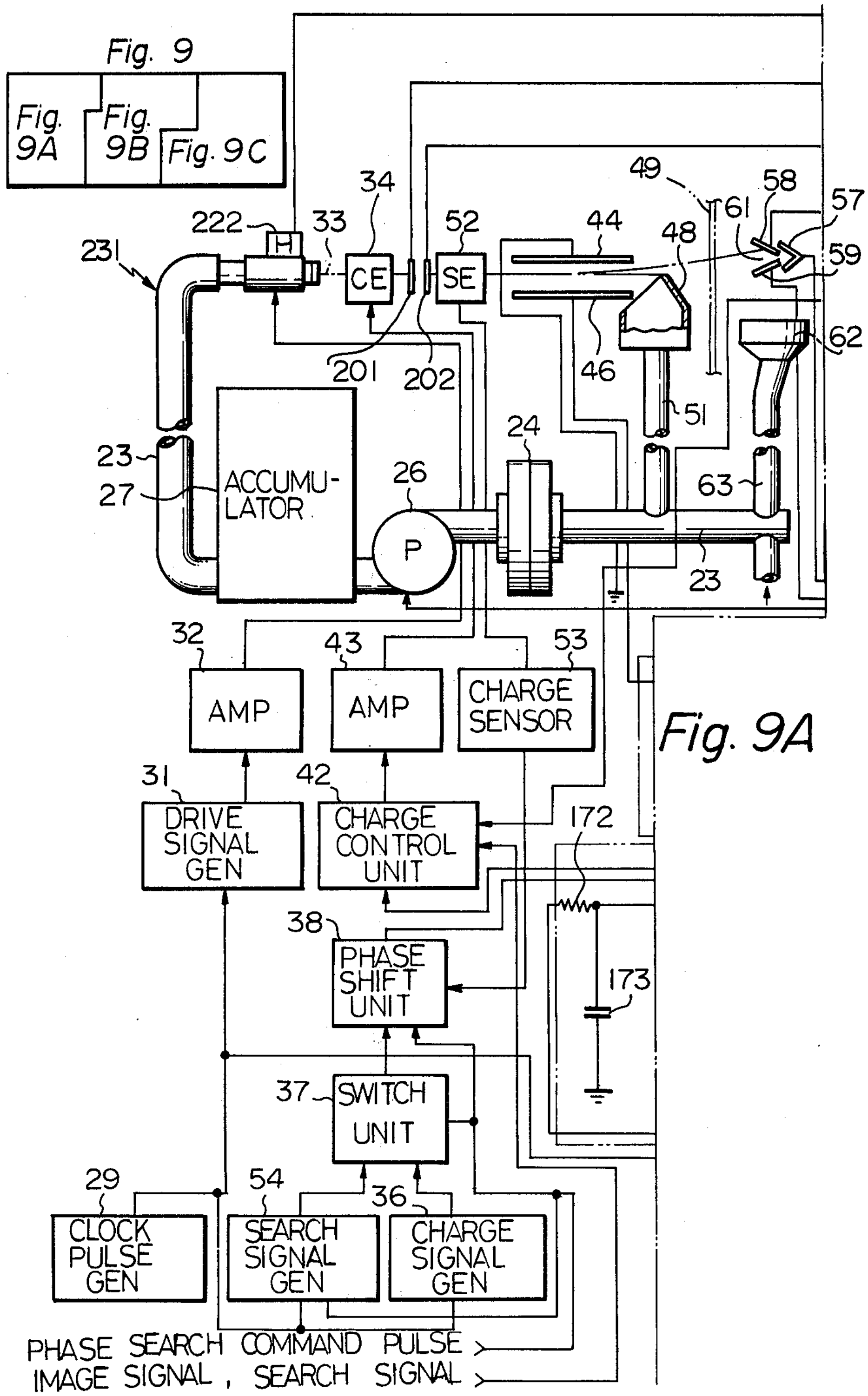
Figure 9B:
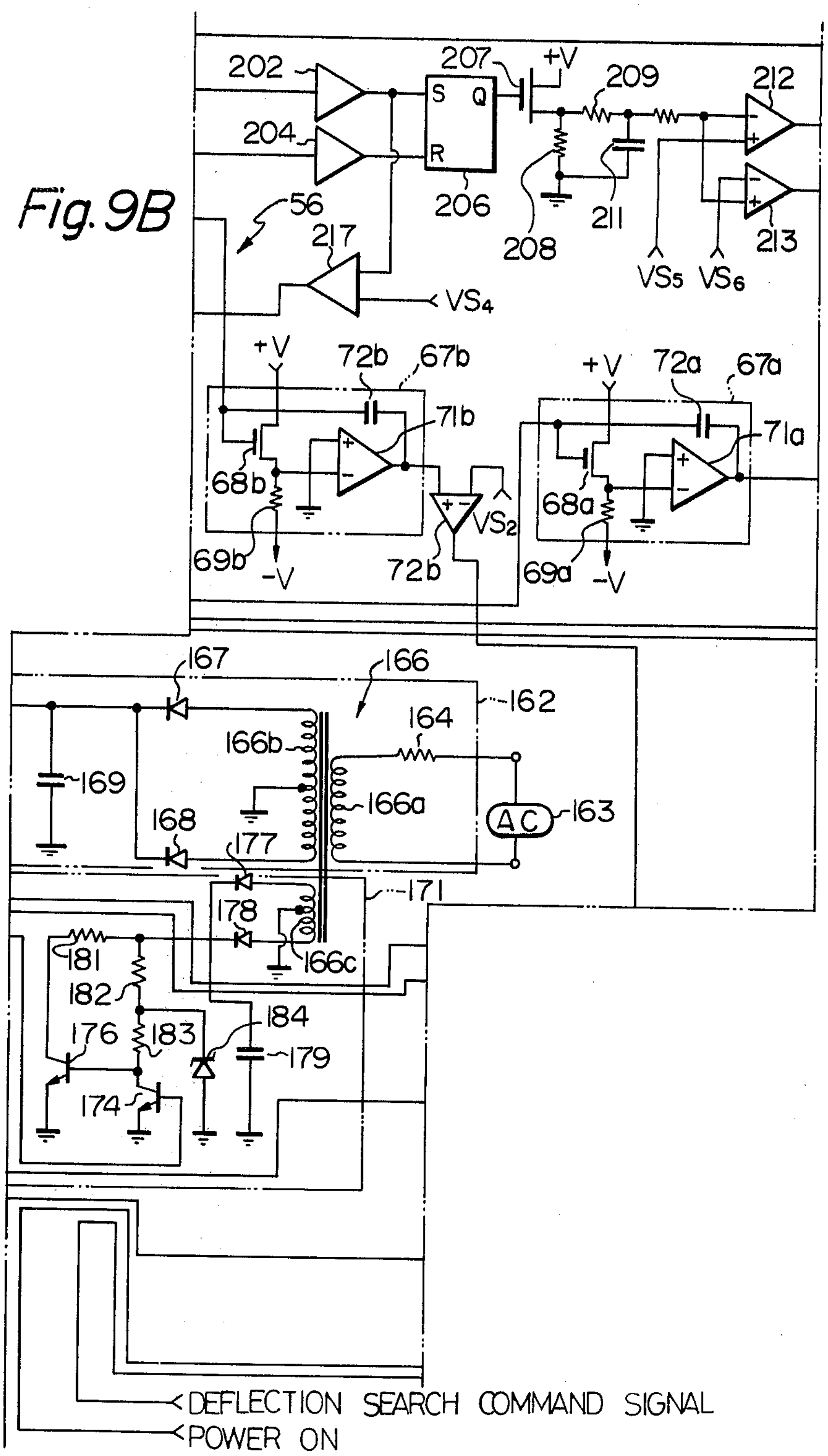
Figure 9C:
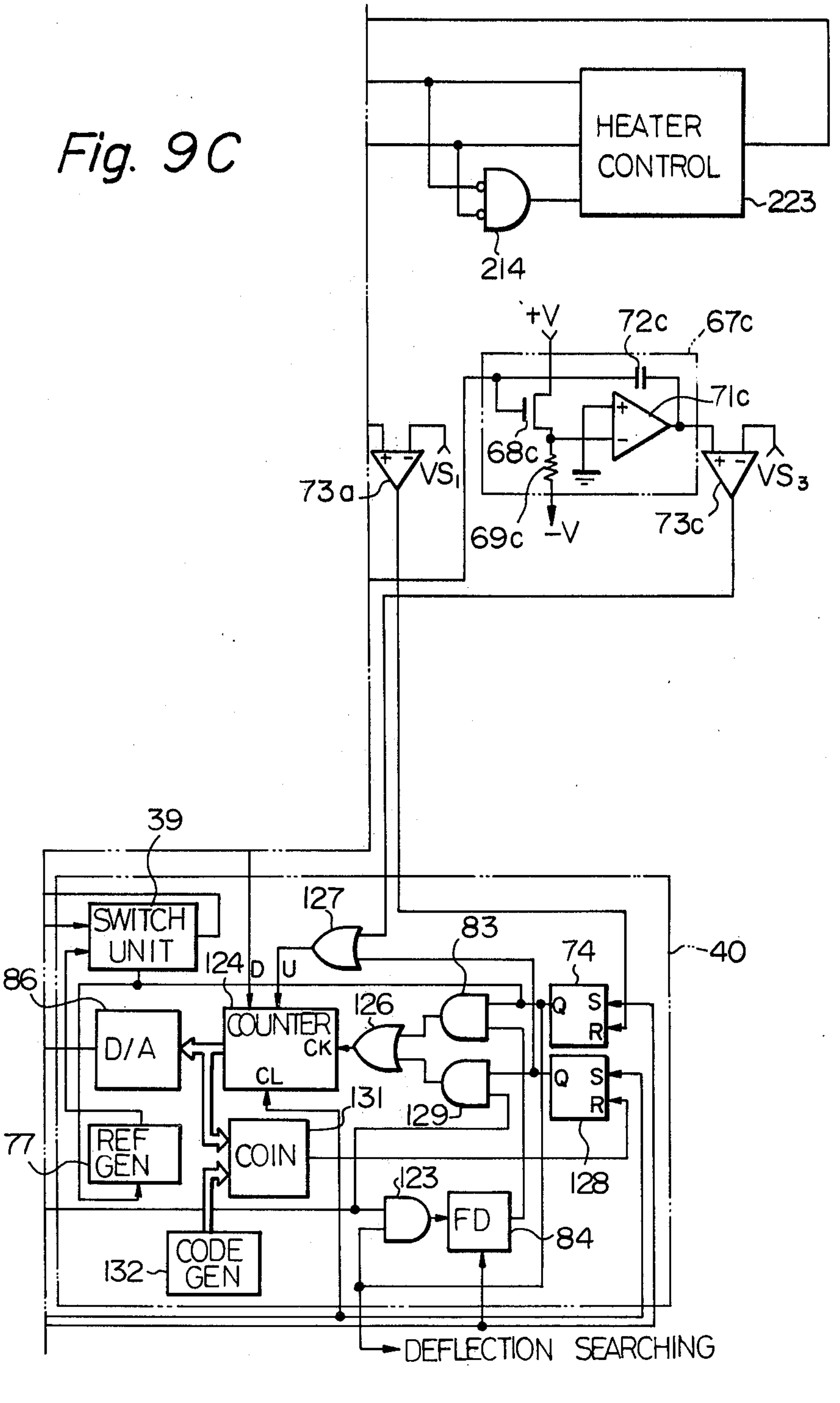

FIGS. 8 and 9 illustrate another embodiment of the present invention in which the ink ejection velocity is controlled by means of an ink heater 222 provided to the ejection nozzle 28. In an apparatus 221 of FIG. 8 the deflection is controlled by means of the charge applied to the electrode 34 whereas in an apparatus 231 of FIG. 9 the deflection is controlled by means of the voltage applied to the electrode 46.

In this case, the outputs of the comparators 212 and 213 as well as the output of the AND gate 214 are connected to a heater control unit 223 which controls the thermal output of the heater 222. The control unit 223 may vary the voltage, current, duty cycle or the like of electrical power applied to the heater 222 in any known manner.

When the comparator 212 produces a high output indicating excessive ejection velocity, the heater control unit 223 reduces the power supplied to the heater 222 and thereby the thermal output thereof to reduce the temperature of the ink and thereby the ejection velocity. When the comparator 213 produces a high output indicating that the ejection velocity is too low, the control unit 223 reduces the thermal output of the heater 222 to decrease the ejection velocity.

Where the sensors 201 and 202 are replaced by photosensors and the temperature control is continuous (the AND gate 214 is omitted), the heater 222 may be replaced by two thermomodules such that the heating end of one thermomodule and the cooling end of the other thermomodule are disposed in the ink flow path. The thermomodules, although not shown, would be controlled alternatively in accordance with the outputs of the comparators 212 and 213.

In summary, it will be seen that the present invention provides an ink ejection printing apparatus which enables optimal ink deflection and velocity adjustment in an automatic manner. Various modifications will become possible for those skilled in the art after receiving the teachings of the present disclosure without departing from the scope thereof. For example, the target unit 56 may be replaced with photosensors, piezoelectric sensors or the like to sense impingement of the ink jet on a target. The counters and voltage polarities may be adapted to be opposite to that described as long as the desired results are obtained. Although the present apparatus has been described and illustrated as being provided with an ink ejection head comprising a single nozzle, the present invention is equally applicable to a multi-jet head apparatus. The head and electrode assembly may be moved relative to the paper rather than vice-versa. As yet another modification, the phase of the ejection pulses may be shifted while the phase of the charging pulses is maintained constant.

What is claimed is:

1. An ink ejection apparatus including ink ejection means for ejecting and charging ink and deflecting the ink from an ejection axis in a direction in response to a deflection signal, characterized by comprising:

velocity sensor means for sensing an ejection velocity of the ejected ink;

control means for controlling the ink ejection means to sweepingly vary the ejection velocity of the ink until the sensed ejection velocity is equal to a predetermined value;

target means spaced from the ejection axis in said direction;

hit sensor means for sensing impingement of the ink on the target means and producing a hit signal in response thereto; and deflection sweep means for controlling the ink ejection means, after the control means adjusts the ejection velocity to the predetermined value, to sweepingly vary deflection of the ink until the hit sensor means produces the hit signal.

2. An apparatus as in claim 1, in which the ink ejection means comprises an ink ejection pump, the control means being constructed to vary an output pressure of the ink ejection pump.

3. An apparatus as in claim 1, in which the ink ejection means comprises an ink heater, the control means being constructed to vary a thermal output of the heater.

4. An apparatus as in claim 1, in which the control means is constructed to control the ink ejection means to sweepingly decrease the ejection velocity when the sensed ejection velocity is above the predetermined value and to sweepingly increase the ejection velocity when the sensed ejection velocity is below the predetermined value.

5. An apparatus as in claim 1, in which the control means is constructed to control the ink ejection means to latch the ejection velocity at a present value when the sensed ejection velocity is equal to the predetermined value.

6. An apparatus as in claim 6, in which the target means comprises an electrode, the hit sensor means comprising electrometer means.

7. An apparatus as in claim 6, in which the electrometer means comprises an integrating circuit.

8. An apparatus as in claim 1, in which the ink ejection means comprises a charging electrode for charging the ink, the deflection sweep means being constructed to vary a charging voltage applied to the charging electrode.

9. An apparatus as in claim 1, in which the ink ejection means comprises a deflection electrode for deflecting the charged ink when the deflection signal is applied thereto, the deflection sweep means being constructed to vary a magnitude of the deflection signal.

10. An apparatus as in claim 1, in which the target means comprises first and second plates defining a slit therebetween and a target disposed behind the slit such that the ink must pass through the slit to reach the target, the sensor means producing the hit signal in response to impingement of the ink on the target.

11. An apparatus as in claim 1, in which the ink ejection means comprises nozzle means for ejecting ink in response to ejection pulses, charging means for charging the ink in response to charging pulses, charge sensor means for sensing when the ink has a predetermined charge and producing a phase set signal in response thereto and phase sweep means for sweepingly varying a phase between the ejection pulses and the charging pulses until the charge sensor means produces the phase set signal.

12. An apparatus as in claim 11, in which the deflection sweep means is constructed to control the ink ejection means to begin variation of the deflection of the ink after the charge sensor means produces the phase set signal.

13. An apparatus as in claim 1, in which the deflection sweep means comprises a counter, count sweep means for sweepingly varying a count in the counter and analog-to-digital converter means for producing a deflection sweep signal corresponding to the count in the counter, the ink ejection means deflecting the ink by an amount corresponding to the deflection sweep signal.

14. An apparatus as in claim 13, in which the count sweep means comprises reset means for initially resetting the counter and pulse generator means for applying pulses to the counter causing the counter to increment.

15. An ink ejection apparatus including ink ejection means for ejecting and charging ink and deflecting the ink from an ejection axis in a direction in response to a deflection signal, characterized by comprising:

velocity sensor means for sensing an ejection velocity of the ejected ink;

control means for controlling the ink ejection means to sweepingly vary the ejection velocity of the ink until the sensed ejection velocity is equal to a predetermined value;

target means spaced from the ejection axis in said direction;

hit sensor means for sensing impingement of the ink on the target means and producing a hit signal in response thereto; and deflection sweep means for controlling the ink ejection means, after the control means adjusts the ejection velocity to the predetermined value, to sweepingly vary deflection of the ink until the hit sensor means produces the hit signal;

the target means comprising a main target, the hit sensor means producing the hit signal in response to impingement of the ink on the main target, a first auxiliary target spaced from the main target in said direction and a second auxiliary target spaced from the main target opposite to said direction, the hit sensor means being furthr constructed to produce a first auxiliary hit signal in response to impingement of the ink on the first auxiliary target and a second auxilary hit signal in response to impingement of the ink on the second auxiliary target, the deflection sweep means causing the ink ejection means to sweep the ink opposite to said direction in response to the first auxiliary hit signal and to sweep the ink in said direction in response to the second auxiliary hit signal.

16. An apparatus as in claim 15, in which the first and second auxiliary targets comprise plates defining a slit therebetween, the main target being disposed behind the slit such that the ink must pass through the slit to reach the main target.

17. An ink ejection apparatus including ink ejection means for ejecting and charging ink and deflecting the ink from an ejection axis in a direction in response to a deflection signal, characterized by comprising:

velocity sensor means for sensing an ejection velocity of the ejected ink;

control means for controlling the ink ejection means to sweepingly vary the ejection velocity of the ink until the sensed ejection velocity is equal to a predetermined value;

target means spaced from the ejection axis in said direction;

hit sensor means for sensing impingement of the ink on the target means and producing a hit signal in response thereto; and deflection sweep means for controlling the ink ejection means, after the control means adjusts the ejection velocity to the predetermined value, to sweepingly vary deflection of the ink until the hit sensor means produces the hit signal;

the deflection sweep means comprising a counter, count sweep means for sweepingly varying a count in the counter and analog-to-digital converter means for producing a deflection sweep signal corresponding to the count in the counter, the ink ejection means deflecting the ink by an amount corresponding to the deflection sweep signal;

the target means comprising a main target, the hit sensor means producing the hit signal in response to impingement of the ink on the main target, a first auxiliary target spaced from the main target in said direction and a second auxiliary target spaced from the main target opposite to said direction, the hit sensor means being further constructed to produce a first auxiliary hit signal in response to impingement of the ink on the first auxiliary target and a second auxiliary hit signal in response to impingement of the ink on the second auxiliary target, the counter being an up-down counter, the count sweep means comprising pulse generator means for applying pulses to a count input of the counter and control means for causing the counter to count up in response to the second auxiliary hit signal and to count down in response to the first auxiliary hit signal.

18. An apparatus as in claim 17, in which the count sweep means further comprises initialization means for setting an initial count into the counter.

* * * * *